March 12, 1957 W. S. CARLEY 2,785,342

PULSE POLARITY REVERSING CIRCUIT FOR NEGATIVE INPUT PULSES

Filed April 6, 1954

INVENTOR
WILLIAM S. CARLEY

BY

G. D. O'Brien
W. O. Quesenbery
ATTORNEYS

United States Patent Office 2,785,342

Patented Mar. 12, 1957

2,785,342

PULSE POLARITY REVERSING CIRCUIT FOR NEGATIVE INPUT PULSES

William S. Carley, Montgomery County, Md., assignor to the United States of America as represented by the Secretary of the Navy Application April 6, 1954, Serial No. 421,462

5 Claims. (Cl. 315—168)

(Granted under Title 35, U. S. Code (1952), sec. 266)

The invention described herein may be manufactured and used by or for the Government of the United States of America for governmental purposes without the payment of any royalties thereon or therefor.

This invention relates to an electric control circuit and more particularly to a thyratron triggering circuit for use with negative input pulses by which a pulse polarity reversing relationship is provided.

More specifically, the circuit of this invention is for the purpose of enabling the firing of a gas filled discharge or thyratron tube with a negative pulse.

The circuit to be controlled is connected in series with the anode cathode circuit of the electronic relay and control for this switching is provided by application of a suitable positive pulse on the tube grid. Since thyratrons can only be fired by a positive pulse, prior thyratron circuitry has incorporated a one-stage amplifier to invert a negative input impulse to a positive firing pulse when the available control source provided a signal possessing only negative pulse characteristics.

The instant invention obviates the requirement of an additional amplifier stage for this pulse polarity inversion. It incorporates a capacitance charging circuit and a diode of the germanium crystal variety to provide a positive pulse at the thyratron grid when the control circuit input is subjected to negative firing pulses.

It is a feature of this invention to provide a thyratron triggering circuit by which sensitivity to the application of negative input control pulses is advantageously obtained for tube firing.

One object of the instant invention is to provide thyratron tube firing from a condenser charged to a positive potential under negative pulse influences.

Another object of the invention resides in the elimination of the necessity for an amplifier stage for pulse polarity reversal in the firing of a thyratron tube from a negative input pulse.

Another object is to incorporate a crystal diode in a bias clamp type circuit for providing negative pulse inversion for a triggering pulse for thyratron tube firing.

Another object resides in the provision of thyratron firing circuit which is operative in response to a negative input pulse signal and in which the necessity for mechanical pulse inversion or amplifier stages of negative pulse circuits is substantially eliminated.

Figure 1:
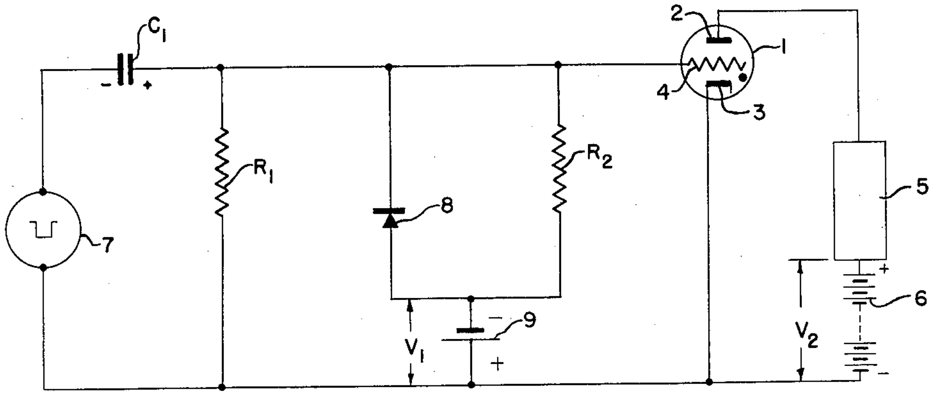
Figure 2:
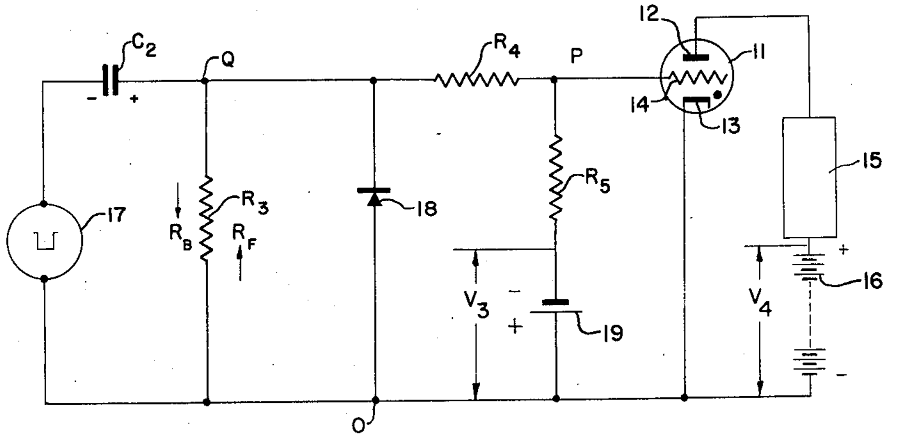

Other objects and many of the attendant advantages of this invention will be readily appreciated as the same becomes better understood by reference to the following detailed description when considered in connection with the accompanying drawing wherein:

Fig. 1 is a schematic illustration of the electrical circuitry of one embodiment of the instant invention; and Fig. 2 is a schematic circuit of an alternative embodiment of the invention.

Referring now to Fig. 1 of the drawing, there is shown a triggering circuit for a thyratron tube 1 of the gas-filled triode variety and of a conventional nature having an anode 2, cathode 3 and a control electrode or grid 4 for initiating conduction or firing for a relay type controlled circuit. Such a circuit includes a load generally indicated at 5 and a source of potential $V_2$ indicated by the battery 6. Battery 6 and load 5 are connected in series across the anode 2 and cathode 3 of this type of electronic relay. It is to be understood that the invention is not limited to the use of a triode type thyratron since pentodes and other types of gas discharge tubes may advantageously be controlled by a grid circuit of a character of the instant invention. Also the showing is of a cold cathode type tube but it is further to be understood that tubes using a filamentary heater are considered to be within the scope of the instant invention.

Firing or conduction from anode 2 to cathode 3 of the tube 1 occurs by rendering the gas therein conductive when the tube grid which is normally biased negative below the cutoff value is rendered less negative by application of a positive potential thereto and when the anode is at a potential only slightly below the conduction point therefor.

The grid bias and triggering circuit of Fig. 1 for the tube 1 includes a charging circuit for the capacitor $C_1$ which is charged through battery 9 and the diode 8 in the conductive or low forward resistance direction thereof when a negative input pulse is applied by the negative pulse generating source generally indicated at 7. A negative input pulse of magnitude $$A>V_1\frac{R_1}{R_1+R_2}$$

will charge capacitor $C_1$ to almost A if $R_2>>R_1$. This charge on the condenser will have the polarity indicated on Fig. 1 of the drawings. The time constant of this circuit is very small. The capacitor discharge current flows through $C_1$, $R_1$ and the impedance of generator 7.

When the negative pulse is removed at 7, the capacitor $C_1$ appears to the tube as a source of positive firing potential applied across the grid cathode circuit thereof in which the positively charged plate of the capacitor is connected as a positive potential to the grid 4 of the thyratron tube 1 with the negative plate of the capacitor $C_1$ returned to the cathode through the impedance of the generator. The time constant is now long since the back resistance of the crystal diode 8 is high. The positive voltage then appearing on the tube grid from condenser $C_1$ causes the tube to fire. In order to obtain reliable operation, the magnitude or value A of the input pulse should be greater than the bias voltage.

Referring now to Fig. 2 of the drawing there is shown a second embodiment of the invention which utilizes a capacitor $C_2$ and charging resistance $R_3$ which represents the equivalent circuit of the resistance of the crystal diode 18 and which is connected in a similar manner to that of the charging circuit for the capacitor $C_1$ of the circuit of Fig. 1 for capacitor charging from a negative pulse generator 17. A resistance element $R_3$ may be utilized in the circuit, or if desired this element $R_3$ may be omitted and the high back resistance $R_B$ of the crystal diode 18 utilized in lieu thereof. The low forward resistance $R_F$ of diode 18 functions as a charging resistance whereby condenser $C_2$ will be charged to the polarity indicated at $C_2$ by application of a negative pulse from the generator 17 in like manner to the circuit of Fig. 1. The grid cathode circuit of the tube 11 having grid 14 and cathode 13 includes the resistance $R_4$ connected in series between the grid and the positively charged plate of capacitor $C_2$ to prevent a rapid bleed-off of the positive signal presented to the grid 14 for tube firing. The grid bias is provided by the battery 19 connected to apply a negative potential $V_3$ through the grid bias resistor $R_5$ between the grid 14 and cathode 13 similarly as in Fig. 1. The plate-cathode circuit of the tube 11 of Fig. 2 is generally identical with that of Fig. 1 and includes the load to be controlled indicated in block form at 15 and connected in series with the source of potential $V_4$ represented as battery 16 and of the polarity indicated. It is connected through the anode 12 and cathode 13 of tube 11 to provide a relay or switching action for the load circuit when the tube is rendered conducting by a firing signal applied across the grid-cathode circuit thereof.

The operation of the circuit of Fig. 2 will become apparent from the relationship hereinafter set forth wherein the voltage between the points O and P represented as $$E_{OP}=-V_3\left(1-\frac{R_5}{R_5+R_4+R_F}\right)$$

the voltage between the points O and P represented as $$E_{OQ}=-V_3\frac{R_F}{R_5+R_4+R_F}$$

wherein $R_F$ at $R_3$ is the forward resistance of the crystal, and $R_B$ at $R_3$ is the back resistance of the crystal.

If a negative pulse of amplitude A with $(A>E_{OQ})$ is applied to the circuit by negative pulse generator 17, capacitor $C_2$ will be charged up to $(A-E_{OQ})$ as the time constant of the charging circuit is very small due to the forward resistance $R_F$ of the crystal. After the pulse is removed the condenser $C_2$ will discharge with a long time constant as the back resistance $R_B$ of the crystal is high. The A. C. voltage from $$O \text{ to } P=[(A-E_{OQ})]\frac{R_5}{R_4+R_5}e^{-t/R_BC}$$

This will fire the thyratron.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In a thyratron firing circuit of the character described including a gas filled tube having a cathode, anode and control electrode or grid, a grid biasing circuit connected between the grid and cathode of the tube including a source of potential and a biasing resistance means, a crystal diode connected in parallel with at least a portion of said biasing circuit, a negative pulse source connected to said grid and means comprising a capacitance element connected in series in said grid pulse source circuit in a manner to be charged to apply a positive firing potential to said tube grid from a negative pulse applied thereto through the grid biasing potential source and the forward resistance of said diode, and a load circuit connected to said plate and said cathode in the circuit for control by said tube.

2. In combination in an electronic relay circuit, means comprising a gas filled triode tube for control of a load circuit connected in series with the anode and cathode of said tube, means for initiating tube conduction from a negative signal voltage applied across the grid cathode circuit of said tube comprising capacitance means adapted to be charged by said negative signal to a positive potential on one plate thereof, said plate being connected to said grid, a negative pulse generating source for said signal, means comprising a crystal diode connected to provide a low forward charging path in the conducting direction thereof and a high hold-off resistance to condenser discharge in the back resistance direction thereof, said condenser having the positively charged plate connected to apply a positive firing potential to said gas tube grid, and means including a source of potential for applying grid bias.

3. A grid control circuit for firing a gas discharge tube of the thyratron variety from a negative pulse signal generator comprising circuit means providing a fixed grid bias potential for said tube, a condenser connected in said grid cathode circuit of said tube, and means including an asymmetrically conducting impedance element for providing a low resistance condenser charging path in the direction of the forward resistance thereof and providing a high back-resistance path to condenser discharge.

4. The combination in a gas triode discharge device, of a grid control circuit for firing said tube from a negative pulse signal, a negative pulse signal generator, means in said circuit for providing a fixed grid bias potential for said tube, means including a condenser connected in said grid circuit of said tube, and means including an asymmetrically conducting impedance element for providing a low resistance condenser charging path in the direction of the forward resistance thereof and providing a high back resistance path to condenser discharge, said condenser being connected to apply a firing potential to said grid when said negative pulse is removed.

5. In a tube triggering circuit, a gaseous discharge tube having a cathode, an anode, and a grid, said anode and cathode being connected across a load in series with a source of high potential, a control circuit including a capacitor connected to said grid, a source of negative pulses connected to said grid through said control circuit, said capacitor being connected in series with said source of negative pulses and said grid, an asymmetrical resistance circuit connected across said source of pulses and said capacitor in series, said resistance offering low resistance to the charging of said capacitor and a high resistance to the discharge of said capacitor, said capacitor continuously presenting its positively charged side to said grid, and a source of fixed grid bias connected to the grid cathode circuit.

References Cited in the file of this patent

UNITED STATES PATENTS 2,503,835 Montgomery ---------- Apr. 11, 1950

FOREIGN PATENTS 548,236 Great Britain ------------ Oct. 1, 1942